3,220,988
POLYHALOGEN CONTAINING BICYCLIC COMPOUNDS AND POLYMERS THEREOF
Paul E. Hoch, Youngstown, N.Y., assignor to Hooker Chemical Corporation, Niagara Falls, N.Y., a corporation of New York
No Drawing. Filed Aug. 26, 1958, Ser. No. 757,187
24 Claims. (Cl. 260—82.1)

This invention relates to new compositions of matter. More specifically, this invention resides in new polyhalogen containing bicyclic compounds having the following structural formua:

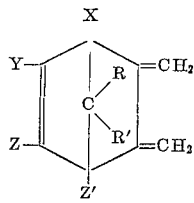

wherein R and R' are selected from the group consisting of hyrogen, chlorine, mixtures of hydrogen and chlorine, fluorine, bromine, alkoxy containing from one to eight carbon atoms, thioether containing from one to six carbon atoms, and =CCl$_2$; and wherein X is selected from the group consisting of methoxy, bromine, chlorine, and fluorine, provided that when X is methoxy R and R' must be methoxy, and when X is fluorine R and R' must be fluorine; and wherein Y is selected from the group consisting of perchlorovinyl, bromine, chlorine and fluorine, provided that when Y is perchlorovinyl R and R' must be chlorine, and when Y is fluorine R and R' must be fluorine; and wherein Z and Z' are selected from the group consisting of fluorine, bromine, chlorine and mixtures thereof, provided that when Z is fluorine R and R' must be fluorine, and when Z' is fluorine R and R' must be fluorine.

These compounds are monomers which may be homopolymerized or copolymerized either in bulk, suspension, or in emulsion. The resulting homopolymers which are obtained are thermoplastic materials which may be molded by conventional techniques. By careful control of conditions bulk polymerization of the monomers give hard, clear materials either in tubes or sheets. Due to the high percentage of chlorine present in the materials, the polymers are self-extinguishing when ignited. Copolymers may be prepared from this monomer and compounds containing a polymerizable CM$_2$=C< group. The resulting copolymers may be plastic or elastomeric depending on the comonomers employed. The elastomeric copolymer may be molded and vulcanized by conventional techniques. The chlorine content of these polymers can be made sufficiently high to render these materials self-extinguishing when ignited. These compounds, therefore, find wide utility in the preparation of copolymers with the above compounds to increase the fire resistance either as molded articles, sheets or foams.

Compounds having the above structural formula wherein R and R' are selected from the group consisting of chlorine, hydrogen and mixtures thereof include but not limited to the following:

1,4,5,6,7,7-hexachloro-2,3-dimethylenebicyclo-(2.2.1)-heptene-5;
1,4,5,6-tetrabromo-7,7-dichloro-2,3-dimethylenebicyclo(2.2.1)-heptene-5;
1,4,5,6,7-pentachloro-2,3-dimethylenebicyclo-(2.2.1)-heptene-5;
1,4,5,6-tetrabromo-7-chloro-2,3-dimethylenebicyclo-(2.2.1)-heptene-5;
1,4,5,6-tetrachloro-2,3-dimethylenebicyclo-(2.2.1)-heptene-5;
1,4,5,6-tetrabromo-2,3-dimethylenebicyclo-(2.2.1)-heptene-5;
1,4,6,7,7-pentachloro-5-perchlorovinyl-2,3-dimethylenebicyclo-(2.2.1)-heptene-5;
1,5,6,7,7-pentachloro-4-bromo-2,3-dimethylenebicyclo-(2.2.1)-heptene-5;
1,6,7,7-tetrachloro-4,5-dibromo-2,3-dimethylenebicyclo-(2.2.1)-heptene-5; etc.

Compounds having the above structural formula wherein R and R' are the same and are selected from the group consisting of fluorine, bromine, alkoxy containing from one to eight carbon atoms, thioether containing from one to six carbon atoms and =CCl$_2$ include but not limited to the following:

1,4,5,6-tetrachloro-7,7-difluoro-2,3-dimethylenebicyclo-(2.2.1)-heptene-5;
1,4,5,6,7,7-hexafluoro-2,3-dimethylenebicyclo-(2.2.1)-heptene-5;
1,4,5,6-tetrabromo-7,7-difluoro-2,3-dimethylenebicycle-(2.2.1)-heptene-5;
1,4,5-trichloro-6-bromo7,7-difluoro-2,3-dimethylenebicyclo-(2.2.1)-heptene-5;
1,4,5-trichloro-6-fluoro-7,7-difluoro-2,3-dimethylenebicyclo-(2.2.1)-heptene-5;
1,4,5,6-tetrachloro-7,7-dibromo-2,3-dimethylenebicyclo-(2.2.1)-heptene-5;
1,4,5,6,7,7-hexabromo-2,3-dimethylenebicyclo-(2.2.1)-heptene-5;
1,4,5-trichloro-6,7,7-tribromo-2,3-dimethylenebicyclo-(2.2.1)-heptene-5;
1,4,5,6-tetrachloro-7,7-dimethoxy-2,3-dimethylenecyclo-(2.2.1)-heptene-5;
1,4,5,6-tetrachloro-7,7-dioctoxy-2,3-dimethylenebicyclo-(2.2.1)heptene-5;
1,4,5,6-tetrabromo-7,7-dimethoxy-2,3-dimethylenebicyclo-(2.2.1)-heptene-5;
1,4,5,6-tetrabromo-1,7-dioctoxy-2,3-dimethylenebicyclo-(2.2.1)-heptene-5;
1,4,5-trichloro-6-bromo-7,7-dimethoxy-2,3-dimethylenebicyclo-(2.2.1)-heptene-5;
1,4,5,6-tetrachloro-7,7-thiomethyl-2,3-dimethylenebicyclo-(2.2.1)-heptene-5;
1,4,5,6-tetrachloro-7,7-thiohexyl-2,3-dimethylenebicyclo-(2.2.1)-heptene-5;
1,4,5,6-tetrabromo-7,7-thiomethyl-2,3-dimethylenebicyclo-(2.2.1)-heptene-5;
1,4,5,6-tetrabromo-7,7-thiohexyl-2,3-dimethylenebicyclo-(2.2.1)-heptene-5;
1,4,5,-trichloro-6-bromo-7,7-thiomethyl-2,3-dimethylenebicyclo-(2.2.1)-heptene-5;
1,4,5,6-tetrachloro-7-dichloromethylene-2,3-dimethylenebicyclo-(2.2.1)-heptene-5;
1,4,5,6-tetrabromo-7-dichloromethylene-2,3-dimethylenebicyclo-(2.2.1)-heptene-5;
1,4,5-trichloro-6-bromo-7-dichloromethylene-2,3-dimethylenebicyclo-(2.2.7)-heptene-5; etc.

The compounds of the present invention may be prepared by (1) heating a compound having the following structural formula:

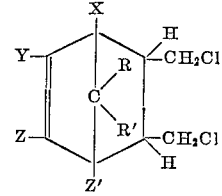

wherein R and R' are selected from the group consisting of hydrogen, chlorine, mixtures of hydrogen and chlorine, fluorine, bromine, alkoxy containing from one to eight carbon atoms, thioether containing from one to six carbon atoms, and =CCl$_2$; and wherein X is selected from the group consisting of methoxy, bromine, chlorine, and fluorine, provided that when X is methoxy R and R' must be methoxy, and when X is fluorine R and R' must be fluorine; and wherein Y is selected from the group consisting of perchlorovinyl, bromine, chlorine and fluorine, provided that when Y is perchlorovinyl R and R' must be chlorine, and when Y is fluorine R and R' must be fluorine; and wherein Z and Z' are selected from the group consisting of fluorine, bromine, chlorine and mixtures thereof, provided that when Z is fluorine R ad R' must be fluorine, and when Z' is fluorine R and R' must be fluorine; (2) in an alcoholic solution of an alkali hydroxide such as potassium hydroxide, sodium hydroxide, lithium hydroxide, rubidium hydroxide, etc; (3) at a temperature of between about twenty degrees centigrade and one hundred degrees centigrade. The starting material shown above has chlorine substituted on the methyl groups attached at the two and three positions. It is to be understood that analogous materials may also be used, e.g., bromine substituted on the methyl groups attached at the two and three positions. The time allowed for reaction will naturally vary with the purity of the reactants, the degree of completion of reaction desired, the reaction temperature, etc. The product thus obtained may be isolated from solution by procedures known in the art.

The compounds of the present invention may be prepared by simply mixing the reactants in the desired proportions. However, the preferred procedure is to add the chloride portionwise to the alcoholic solution containing the alkali hydroxide. Equivalent amounts of reactants may be employed, i.e., two moles of alkali hydroxide per mole of chloride. It is preferred to use a slight excess of alkali hydroxide.

The starting materials may be prepared in accordance with the method outlined in copending application Ser. No. 748,135 entitled, "Adducts of Hexachlorocyclopentadiene." In that patent application is disclosed and claimed the compound 1,4,5,6,7,7-hexachloro-2,3-dichloromethylbicyclo-(2.2.1)-heptene-5. This compound is prepared in high yields by the Diels-Alder adduction of hexachlorocyclopentadiene as the diene and 1,4-dichlorobutene-2 as the dienophile. The Diels-Alder adduction is normally carried out at elevated temperatures. A solvent may be employed, if desired. The other compounds which are starting materials in the present invention may be prepared in a similar manner, for example, 1,4,5,6-tetrachloro - 7,7 - dimethoxy - 2,3 - dichloromethyl - bicyclo - (2.2.1)-heptene-5 may be prepared by the Diels-Alder adduction of 1,1-dimethoxy-2,3,4,5-tetrachlorocyclopentadiene as the diene and 1,4-dichlorobutene-2 as the dienophile.

In order that those skilled in the art may have sufficiently detailed instructions in preparing the compounds of the present invention, the following examples will illustrate typical procedures. This detailed disclosure is not to be construed as limiting the scope of the present invention as further indicated elsewhere herein.

Examples I through VIII represent the preparation of a representative compound of the present invention and copolymers thereof wherein R and R' are selected from the group consisting of hydrogen, chlorine, and mixtures thereof. The compound that has been selected is the compound when R and R' are both chlorine, however, any of the above compounds may be prepared and polymerized in a similar manner.

*Example I*

Fifty-five grams of eighty-five percent potassium hydroxide was dissolved in five hundred cubic centimeters of ethanol. The mixture was stirred and heated to between about sixty and about seventy degrees centigrade. One hundred and thirty-five grams of solid 1,4,5,6,7,7-hexachloro - 2,3 - dichloromethylbicyclo - (2.2.1) - heptene-5 was added portionwise over a period of seventy-five minutes. The suspension was stirred at from about seventy to about seventy-five degrees centigrade for about nine hours. The contents of the flask were filtered and the filtrate poured into an excess of water (approximately two liters). The long, colorless to light brown prisms which formed were collected and recrystallized in methanol. One hundred and eight grams (98.5 percent yield) of solid 1,4,5,6,7,7-hexachloro-2,3-dimethylenebicyclo-(2.2.1)-heptene-5 were obtained in long, colorless prisms. The molecular weight is three hundred and twenty-five and the melting point from seventy-eight to eighty degrees centigrade.

*Analysis.*—Calculated for C$_9$H$_4$Cl$_6$: Cl, 65.5%. Found: Cl, 65.2%.

The following examples represent the preparation of copolymers of (1) 1,4,5,6,7,7-hexachloro-2,3-dimethylenebicyclo-(2.2.1)-heptene-5 and (2) a compound containing a polymerizable CH$_2$=C< group.

*Example II*

Seventy-five grams of 1,4,5,6,7,7-hexachloro-2,3-dimethylenebicyclo-(2.2.1)-heptene-5 was copolymerized with twenty-five grams of styrene. The product obtained was a hard, thermoplastic, clear resin which was soluble in chlorinated solvents, e.g., chloroform. The product contained forty-nine percent chlorine combined by weight and was self-extinguishing when ignited.

*Example III*

Seventy-five grams of 1,4,5,6,7,7-hexachloro-2,3-dimethylenebicyclo-(2.2.1)-heptene-5 was copolymerized with twenty-five grams of methyl methacrylate. The product obtained was a hard, thermoplastic, clear resin which was soluble in chlorinated solvents, e.g., chloroform. The product contained forty-nine percent chlorine combined by weight and was self-extinguishing when ignited.

*Example IV*

Seventy-five grams of 1,4,5,6,7,7-hexachloro-2,3-dimethylenebicyclo-(2.2.1)-heptene-5 was copolymerized with twenty-five grams of ethyl acrylate. The product obtained was a hard, thermoplastic, clear resin which was soluble in chlorinated solvents, e.g., chloroform. The product contained forty-nine percent chlorine combined by weight and was self-extinguishing when ignited.

*Example V*

A small pressure bottle was charged with 12.5 grams of 1,4,5,6,7,7 - hexachloro - 2,3 - dimethylene - (2.2.1) - heptene-5, one hundred grams of water, 0.15 grams of potassium persulfate, 0.12 grams of mixed tertiary mercaptans and 2.5 grams of Ivory Flakes (a soap marketed by Procter and Gamble Co.). The contents are cooled externally to about minus five degrees centigrade, and 37.5 grams of liquid butadiene are added. The bottle was capped and placed in a constant temperature water bath at forty-five degrees centigrade. The contents of the bottle were stirred with a magnetic stirrer for about forty-three hours. The bottle was cooled to zero degrees centigrade externally and then opened. The resulting emulsion was poured into about one liter of methyl alcohol. A white elastic solid was obtained. The weight after drying was forty-two grams.

*Example VI*

One hundred grams of the crude rubber obtained in Example V was milled with a common tire tread recipe consisting of three grams of zinc oxide, three grams of sulfur, one gram of mercaptobenzothiazole, four grams of stearic acid, one gram of β-phenylnapthyl amine and fifty grams of carbon black. The milled rubber was molded and vulcanized at one hundred and fifty degrees centigrade for thirty minutes to give an elastomer material.

*Example VII*

In a manner after Example V, 12.5 grams of 1,4,5,6,7,7-hexachloro-2,3-dimethylene-(2.2.1)-heptene-5 was copolymerized with 37.5 grams of liquid isoprene. The crude rubber thus obtained was milled, molded and vulcanized in a manner after Example VI.

The following example represents the preparation of a homopolymer.

*Example VIII*

To one hundred grams of 1,4,5,6,7,7-hexachloro-2,3-dimethylene-(2.2.1)-heptene-5 was added one percent of benzoyl peroxide by weight. The mixture was heated to above the melting point, i.e., above seventy-eight to eighty degrees centigrade. In about twelve hours it had polymerized to a clear, thermoplastic resin. This was cured at about one hundred and twenty degrees centigrade for three to four hours to give a clear, pale yellow, hard resin. The product thus obtained 65.5 percent chlorine combined by weight and was self-extinguishing when ignited.

Examples IX through XVI represent the preparation of a representative compound of the present invention and copolymers thereof wherein R and R' are the same and are selected from the group consisting of fluorine, bromine, alkoxy containing from one to eight carbon atoms, thioether containing from one to six carbon atoms and $=CCl_2$. The compound that has been selected is the compound when R and R' are both methoxy; however, any of the above compounds may be prepared and polymerized in a similar manner.

*Example IX*

Twenty-five and eight-tenths grams of eighty-five percent potassium hydroxide was dissolved in two hundred and fifty cc. of ethanol. The mixture was stirred and heated to between about forty and fifty degrees centigrade. Sixty grams of 1,4,5,6-tetrachloro-7,7-dimethoxy-2,3-dichloromethylbicyclo-(2.2.1)-heptene-5 was added portionwise over a period of about forty minutes. The suspension was stirred for about one hour and forty-five minutes at from about forty-five to fifty-five degree centigrade. The solvent was stripped partially under diminished pressure. The remaining salt, ethanol and product was poured into an excess of water (approximately one liter). The soft solid formed was collected and recrystallized in ethanol. Forty-three grams (eighty-five percent yield) of solid 1,4,5,6-tetrachloro-7,7-dimethoxy-2,3-dimethylenebicyclo-(2.2.1)-heptene-5 were obtained in colorless prisms. The molecular weight is three hundred and sixteen and the melting point is from one hundred and three to one hundred and four degrees centigrade.

*Analysis.*—Calculated for $C_{11}H_{10}O_2Cl_4$: Cl, 45.9%. Found: Cl, 45.2%.

The following examples represent the preparation of copolymers of (1) 1,4,5,6-tetrachloro-7,7-dimethoxy-2,3-dimethylenebicyclo-(2.2.1)-heptene-5 and (2) a compound containing a polymerizable $CH_2=C<$ group.

*Example X*

Seventy-five grams of 1,4,5,6-tetrachloro-7,7-dimethoxy-2,3-dimethylenebicyclo-(2.2.1)-heptene-5 was copolymerized with twenty-five grams of styrene. The product obtained was a hard, thermoplastic, clear resin which was soluble in chlorinated solvents, e.g., chloroform. The product contained 34.8 percent chlorine combined by weight and was self-extinguishing when ignited.

*Example XI*

Seventy-five grams of 1,4,5,6-tetrachloro-7,7-dimethoxy-2,3-dimethylenebicyclo-(2.2.1)-heptene-5 was copolymerized with twenty-five grams of methyl methacrylate. The product obtained was a hard, thermoplastic, clear resin which was soluble in chlorinated solvents, e.g., chloroform. The product contained 34.8 percent chlorine combined by weight and was self-extinguishing when ignited.

*Example XII*

Seventy-five grams of 1,4,5,6-tetrachloro-7,7-dimethoxy-2,3-dimethylenebicyclo-(2.2.1)-heptene-5 was copolymerized with twenty-five grams of ethyl acrylate. The product obtained was a hard, thermoplastic, clear resin which was soluble in chlorinated solvents, e.g., chloroform. The product contained 34.5 percent chlorine combined by weight and was self-extinguishing when ignited.

*Example XIII*

A small pressure bottle was charged with 12.5 grams of 1,4,5,6 - tetrachloro - 7,7-dimethoxy-2,3-dimethylenebicyclo-(2.2.1)-heptene-5, one hundred grams of water, 0.15 gram of potassium persulfate, 0.12 gram of mixed tertiary mercaptans and 2.5 grams of Ivory Flakes (a soap marketed by Procter and Gamble Co.). The contents are cooled externally to about minus five degrees centigrade and 37.5 grams of liquid butadiene are added. The bottle was capped and placed in a constant temperature water bath at forty-five degrees centigrade. The contents of the bottle were stirred with a magnetic stirrer for about forty-three hours. The bottle was cooled to zero degrees centigrade externally and then opened. The resulting emulsion was poured into about one liter of methyl alcohol. A white elastic solid was obtained. The weight after drying was forty-two grams.

*Example XIV*

One hundred grams of the crude rubber obtained in Example XIII was milled with a common tire tread recipe consisting of three grams of zinc oxide, three grams of sulfur, one gram of mercaptobenzothiazole, four grams of stearic acid, one gram of β-phenylnapthyl amine and fifty grams of carbon black. The milled rubber was molded and vulcanized at one hundred and fifty degrees centigrade for thirty minutes to give a elastomeric material.

*Example XV*

In a manner after Example XIII, 12.5 grams of 1,4,5,6-tetrachloro-7,7-dimethoxy-2,3-dimethylenebicyclo-(2.2.1)-heptene-5 was copolymerized with 37.5 grams of liquid isoprene. The crude rubber thus obtained was milled, molded and vulcanized in a manner after Example XIV.

The following example represents the preparation of a homopolymer.

*Example XVI*

To one hundred grams of 1,4,5,6-tetrachloro-7,7-dimethoxy - 2,3 - dimethylenebicyclo-(2.2.1)-heptene-5 was added one percent of benzoyl peroxide by weight. The mixture was heated to above the melting point, i.e., above 103 degrees centigrade to 104 degrees centigrade. In about twelve hours it had polymerized to a clear, thermoplastic resin. This was cured at about one hundred and twenty degrees centigrade for three to four hours to give a clear, pale yellow, hard resin. The product thus obtained contained forty-five percent chlorine combined by weight and was self-extinguishing when ignited.

The proportion of (1) the products of the present invention to (2) copolymerizable compound will vary depending upon the copolymerizable compound employed. The temperature of reaction is not critical, and may be varied depending upon the initiator employed, such as benzoyl peroxide, methyl ethyl ketone peroxide, actinic light, etc. Alternatively, the reaction may be initiated by heat alone. Generally, temperatures of from zero to one hundred and thirty degrees centigrade may be employed. Any compound containing a polymerizable CH₂=C< group may be employed; for example, styrene; divinyl compounds, such as butadiene, isoprene, chloroprene, etc.; diallyl compounds such as diallyl phthalate, etc.; chlorinated olefins, such as vinyl chlorides, etc.; unsaturated acids such as acrylic and methacrylic acid and maleic acid and esters thereof; unsaturated anhydrides such as maleic, itaconic, etc.; esters of vinyl alcohol such as vinyl acetate.

Homopolymers may be made by using thermal initiation alone, or by employing free radical, cationic or anionic polymerization techniques. Examples of suitable initiators include tertiary butyl peroxide, benzoyl peroxide, stannic chloride hydrate, alkyl sodium, etc.

The compositions of the present invention, although emphasized as being useful in the preparation of polymers, may also be used to prepare various derivatives useful in other fields, e.g., insecticides, fungicides, miticides, etc.

This invention may be embodied in other forms or carried out in other ways without departing from the spirit or essential characteristics thereof. The present embodiment is therefore to be considered as in all respects, illustrative and not restrictive, the scope of the invention being indicated by the appended claims, and all changes which come within the meaning and range of equivalency of the claims are intended to be embraced therein.

I claim:
1. A composition of matter having the formula:

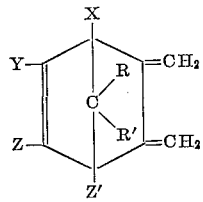

wherein R and R' are selected from the group consisting of hydrogen, chlorine, mixtures of hydrogen and chlorine, fluorine, bromine, alkoxy containing from one to eight carbon atoms, thioether containing from one to six carbon atoms, and =CCl₂; and wherein X is selected from the group consisting of methoxy, bromine, chlorine, and fluorine, provided that when X is methoxy R and R' must be methoxy, and when X is fluorine R and R' must be fluorine; and wherein Y is selected from the group consisting of perchlorovinyl, bromine, chlorine and fluorine, provided that when Y is perchlorovinyl R and R' must be chlorine, and when Y is fluorine R and R' must be fluorine; and wherein Z and Z' are selected from the group consisting of fluorine, bromine, chlorine and mixtures thereof, provided that when Z is fluorine R and R' must be fluorine, and when Z' is fluorine R and R' must be fluorine.

2. 1,4,5,6,7,7 - hexachloro - 2,3 - dimethylenebicyclo-(2.2.1)-heptene-5.

3. 1,4,5,6 - tetrachloro - 7,7 - dimethoxy - 2,3 - dimethylenebicyclo-(2.2.1)-heptene-5.

4. 1,4,5,6 - tetrachloro - 7 - dichloromethylene - 2,3-dimethylenebicyclo-(2.2.1)-heptene-5.

5. 1,4,5,6,7 - pentachloro - 2,3 - dimethylenebicyclo-(2.2.1)-heptene-5.

6. 1,4,5,6 - tetrachloro - 2,3 - dimethylenebicyclo-(2.2.1)-heptene-5.

7. The process which comprises: (1) heating a compound having the formula:

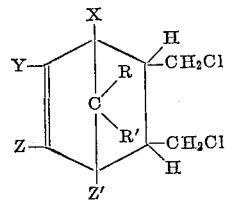

wherein R and R' are selected from the group consisting of hydrogen, chlorine, mixtures of hydrogen and chlorine, fluorine, bromine, alkoxy containing from one to eight carbon atoms, thioether containing from one to six carbon atoms, and =CCl₂; and wherein X is selected from the group consisting of methoxy, bromine, chlorine, and fluorine, provided that when X is methoxy R and R' must be methoxy, and when X is fluorine, R and R' must be fluorine; and wherein Y is selected from the group consisting of perchlorovinyl, bromine, chlorine and fluorine, provided that when Y is perchlorovinyl R and R' must be chlorine, and when Y is fluorine R and R' must be fluorine; and wherein Z and Z' are selected from the group consisting of fluorine, bromine, chlorine and mixtures thereof, provided that when Z is fluorine R and R' must be fluorine, and when Z' is fluorine R and R' must be fluorine; (2) in an alcoholic solution of an alkali hydroxide; (3) at a temperature of between about twenty degrees centigrade and about one hundred degrees centigrade.

8. The process which comprises heating 1,4,5,6,7,7-hexachloro - 2,3 - dichloromethylbicyclo - (2.2.1) - heptene-5 in an alcoholic solution of alkali hydroxide at a temperature of between about twenty degrees centigrade and about one hundred degrees centigrade.

9. The process which comprises heating 1,4,5,6-tetrachloro - 7,7 - dimethoxy - 2,3 - dichloromethylbicyclo-(2.2.1)-heptene-5 in an alcoholic solution of alkali hydroxide at a temperature of between about twenty degrees centigrade and about one hundred degrees centigrade.

10. The process which comprises heating 1,4,5,6-tetrachloro - 7 - dichloromethylene - 2,3 - dichloromethylbicyclo-(2.2.1)-heptene-5 in an alcoholic solution of alkali hydroxide at a temperature of between about twenty degrees centigrade and about one hundred degrees centigrade.

11. The process which comprises heating 1,4,5,6,7-pentachloro - 2,3 - dichloromethylbicyclo - (2.2.1) - heptene-5 in an alcoholic solution of alkali hydroxide at a temperature of between about twenty degrees centigrade and about one hundred degrees centigrade.

12. The process which comprises heating 1,4,5,6-tetrachloro-2,3-dichloromethylbicyclo-(2.2.1)-heptene-5 in an alcoholic solution of alkali hydroxide at a temperature of between about twenty degrees centigrade and about one hundred degrees centigrade.

13. A composition according to claim 1 when polymerized to a thermoplastic polymer.

14. A polymerizable mixture comprising (1) compound according to claim 1 and (2) a compound containing a polymerizable CH₂=C< group.

15. A polymerizable mixture comprising (1) 1,4,5,6,7,7-hexachloro-2,3 - dimethylenebicyclo - (2.2.1) - heptene-5, and (2) a compound containing a polymerizable CH₂=C< group.

16. A polymerizable mixture comprising (1) 1,4,5,6-tetrachloro - 7,7 - dimethoxy - 2,3 -dimethylenebicyclo-(2.2.1)-heptene-5, and (2) a compound containing a polymerizable CH₂=C< group.

17. A polymerizable mixture comprising (1) 1,4,5,6-tetrachloro - 7 - dichloromethylene - 2,3 - dimethylenebicyclo-(2.2.1)-heptene-5, and (2) a compound containing a polymerizable CH₂=C< group.

18. A polymerizable mixture comprising (1) 1,4,5,6,7-pentachloro - 2,3 - dimethylenebicyclo - (2.2.1) - heptene-5, and (2) a compound containing a polymerizable CH₂=C< group.

19. A polymerizable mixture comprising 1,4,5,6-tetrachloro-2,3-dimethylenebicyclo-(2.2.1)-heptene-5, and (2) a compound containing a polymerizable CH₂=C< group.

20. A polymerized composition according to claim 14, wherein said copolymerizable compound (2) is styrene.

21. A polymerized composition according to claim 14 wherein said copolymerizable compound (2) is methyl methacrylate.

22. A polymerized composition according to claim 14 wherein said copolymerizable compound (2) is ethyl acrylate.

23. A polymerized composition according to claim 14 wherein said copolymerized compound (2) is butadiene.

24. A polymerized composition according to claim 14 wherein said copolymerizable compound (2) is isoprene.

References Cited by the Examiner

UNITED STATES PATENTS 2,600,454 6/1952 Wicklatz et al. _____ 260—91.5
2,795,619 6/1957 Goldman _____ 260—82.1
2,912,356 11/1959 Schmerling _____ 260—648

FOREIGN PATENTS 1,002,341 2/1957 Germany.

OTHER REFERENCES

Alder et al., Chem. Bez., 90, pp. 1–7 (1957).

JOSEPH L. SCHOFER, Primary Examiner.

DANIEL ARNOLD, HAROLD N. BURSTEIN, MILTON STERMAN, Examiners.